(12) United States Patent
Lao et al.

(10) Patent No.: US 12,305,088 B2
(45) Date of Patent: May 20, 2025

(54) WATERPROOF SEAMS AND METHODS OF MAKING THE SAME

(71) Applicant: Bemis Associates, Inc., Shirley, MA (US)

(72) Inventors: Ka Chun Lao, Tai Po New Town (HK); Wing Kin Lam, Kwun Tong (HK); Chang Hsien Wu, Taichung (TW)

(73) Assignee: Bemis Associates, Inc., Shirley, MA (US)

( * ) Notice: Subject to any disclaimer, the term of this patent is extended or adjusted under 35 U.S.C. 154(b) by 75 days.

(21) Appl. No.: 18/075,086

(22) Filed: Dec. 5, 2022

(65) Prior Publication Data

US 2023/0193085 A1     Jun. 22, 2023

Related U.S. Application Data

(60) Provisional application No. 63/292,260, filed on Dec. 21, 2021.

(51) Int. Cl.
| | |
|---|---|
| *C09J 7/29* | (2018.01) |
| *B32B 5/02* | (2006.01) |
| *B32B 7/14* | (2006.01) |
| *B32B 37/12* | (2006.01) |
| *C09J 7/30* | (2018.01) |

(52) U.S. Cl.
CPC .............. *C09J 7/29* (2018.01); *B32B 5/02* (2013.01); *B32B 7/14* (2013.01); *B32B 37/1292* (2013.01); *C09J 7/30* (2018.01); *B32B 2305/18* (2013.01); *B32B 2307/402* (2013.01); *B32B 2307/7265* (2013.01); *B32B 2405/00* (2013.01); *C09J 2203/358* (2020.08); *C09J 2400/263* (2013.01); *C09J 2467/006* (2013.01); *C09J 2475/00* (2013.01)

(58) Field of Classification Search
CPC .......... C09J 7/29; C09J 7/30; C09J 2203/358; B32B 5/02; B32B 7/14; B32B 37/1292; B32B 2305/18; B32B 2307/402; B32B 2405/00

See application file for complete search history.

(56) References Cited

U.S. PATENT DOCUMENTS

| | | | | |
|---|---|---|---|---|
| 2,750,315 | A | * | 6/1956 | Tierney ............... B32B 37/1284 428/297.1 |
| 3,047,444 | A | | 7/1962 | Harwood |
| 3,503,821 | A | | 3/1970 | Conklin |

(Continued)

FOREIGN PATENT DOCUMENTS

| | | |
|---|---|---|
| AU | 773998 B2 | 6/2004 |
| CA | 2062839 C | 9/2002 |

(Continued)

OTHER PUBLICATIONS

International Search Report from International Application No. PCT/US2022/051840, dated: Mar. 8, 2023.

(Continued)

*Primary Examiner* — Daniel McNally
(74) *Attorney, Agent, or Firm* — Morse, Barnes-Brown & Pendleton, P.C.; Sean D. Detweiler, Esq.

(57) ABSTRACT

Disclosed herein are improved waterproof seam tapes and methods of producing the same.

12 Claims, 3 Drawing Sheets

(56) References Cited

U.S. PATENT DOCUMENTS

| | | | |
|---|---|---|---|
| 4,094,842 A * | 6/1978 | Wenzel | C08G 18/38 528/499 |
| 4,604,152 A | 8/1986 | Liukko | |
| 4,636,546 A | 1/1987 | Chao | |
| 4,775,719 A | 10/1988 | Markevka et al. | |
| 4,803,109 A | 2/1989 | Saniscalchi | |
| 4,980,404 A | 12/1990 | Aydin et al. | |
| 5,166,302 A | 11/1992 | Werner et al. | |
| 5,533,210 A | 7/1996 | Maderek et al. | |
| 5,569,507 A | 10/1996 | Goodwin et al. | |
| 5,747,102 A | 5/1998 | Smith et al. | |
| 5,885,679 A | 3/1999 | Yasue et al. | |
| 5,932,680 A | 8/1999 | Heider | |
| 5,939,499 A | 8/1999 | Anderson et al. | |
| 6,133,400 A | 10/2000 | Helmeke | |
| 6,296,729 B1 | 10/2001 | Kamiyama et al. | |
| 6,355,317 B1 | 3/2002 | Reid et al. | |
| 6,432,528 B1 | 8/2002 | Faust et al. | |
| 6,548,579 B2 | 4/2003 | Reski et al. | |
| 6,680,100 B1 | 1/2004 | Kocinec et al. | |
| 6,694,528 B1 | 2/2004 | Chang | |
| 6,774,065 B2 | 8/2004 | Haruta et al. | |
| 6,844,073 B1 | 1/2005 | Helmeke et al. | |
| 7,228,809 B2 | 6/2007 | Angelino et al. | |
| 8,574,698 B2 | 11/2013 | Fung et al. | |
| 8,782,812 B2 | 7/2014 | Bansal et al. | |
| 8,993,083 B1 | 3/2015 | Llano | |
| 9,303,193 B2 | 4/2016 | Park et al. | |
| 9,597,867 B2 | 3/2017 | Stamatoukos et al. | |
| 9,925,818 B2 | 3/2018 | Sbuttoni et al. | |
| 9,932,268 B2 | 4/2018 | Dombrowski et al. | |
| 10,072,190 B2 | 9/2018 | Festa, Sr. et al. | |
| 10,086,582 B2 | 10/2018 | Blackford et al. | |
| 10,143,250 B2 | 12/2018 | Schulz | |
| 10,306,940 B2 | 6/2019 | Han | |
| 10,603,851 B2 | 3/2020 | Hilton et al. | |
| 10,899,898 B2 | 1/2021 | Humiston et al. | |
| 2003/0044563 A1 | 3/2003 | Kocinec et al. | |
| 2003/0126673 A1 | 7/2003 | Yardley | |
| 2007/0082165 A1 | 4/2007 | Barrett | |
| 2007/0084390 A1 | 4/2007 | Angelino et al. | |
| 2007/0124849 A1 | 6/2007 | Williams et al. | |
| 2008/0302460 A1 | 12/2008 | Angelino et al. | |
| 2008/0312361 A1 | 12/2008 | Wintermantel et al. | |
| 2009/0047481 A1 | 2/2009 | Welsch et al. | |
| 2009/0061181 A1 | 3/2009 | Imai et al. | |
| 2009/0223622 A1 | 9/2009 | Llano | |
| 2012/0023641 A1 | 2/2012 | Shen et al. | |
| 2013/0302573 A1 | 11/2013 | Terfloth et al. | |
| 2015/0133014 A1 | 5/2015 | Traser et al. | |
| 2015/0306843 A1 | 10/2015 | White et al. | |
| 2017/0203541 A1 * | 7/2017 | El-Tahlawy | B32B 7/06 |
| 2019/0127594 A1 | 5/2019 | Clay et al. | |
| 2019/0316010 A1 | 10/2019 | Kawazoe et al. | |
| 2020/0407608 A1 | 12/2020 | Brown et al. | |
| 2022/0024149 A1 | 1/2022 | Brown et al. | |
| 2024/0409783 A1 | 12/2024 | Brown et al. | |

FOREIGN PATENT DOCUMENTS

| | | | |
|---|---|---|---|
| CA | 3080078 A1 | 5/2019 | |
| CN | 106490699 A | 3/2017 | |
| CN | 109720071 A | 5/2019 | |
| CN | 111674127 A | 9/2020 | |
| DE | 19653301 A1 | 10/1997 | |
| DE | 102004052756 A1 | 12/2005 | |
| EP | 112489 A1 | 7/1984 | |
| EP | 0203106 A1 | 12/1986 | |
| EP | 0252022 A3 | 2/1989 | |
| EP | 0327291 A1 | 8/1989 | |
| EP | 0410291 A3 | 10/1991 | |
| EP | 0410292 A3 | 10/1991 | |
| EP | 0480199 A3 | 6/1992 | |
| EP | 0528981 B1 | 4/1995 | |
| EP | 0769927 B1 | 8/1998 | |
| EP | 0861605 A2 | 9/1998 | |
| EP | 0697847 B1 | 7/1999 | |
| EP | 0 807 515 B1 | 1/2002 | |
| EP | 0949060 A4 | 8/2004 | |
| EP | 1450636 A1 | 9/2004 | |
| EP | 1897926 A1 | 3/2008 | |
| GB | 1273169 A | 5/1972 | |
| GB | 2215660 B | 12/1991 | |
| JP | 6509672 B2 * | 5/2019 | |
| KR | 100134240 | 2/1997 | |
| WO | 1991/007278 A1 | 5/1991 | |
| WO | 1991/015530 A1 | 10/1991 | |
| WO | 93/06183 A1 | 4/1993 | |
| WO | 1996025453 A1 | 8/1996 | |
| WO | 1999/054130 A1 | 10/1999 | |
| WO | 99/55792 A1 | 11/1999 | |
| WO | 01/81444 A1 | 11/2001 | |
| WO | 2010/0114282 A2 | 10/2010 | |
| WO | WO-2010114282 A2 * | 10/2010 | ............ D06B 1/14 |
| WO | 2014/010279 A1 | 1/2014 | |
| WO | 2022/020214 A1 | 1/2022 | |
| WO | 2023/121861 A1 | 6/2023 | |

OTHER PUBLICATIONS

World Premier During 2020 ISPO: Sympatex Technologies And Schoeller Textil Introduce The First Circular Functional Jacket Made From Used Textiles, Press Release. Published: Jan. 28, 2020.

International Search Report from PCT/US2021/042088, dated Oct. 21, 2021.

International Search Report from PCT/US2020/039330, dated Nov. 23, 2020.

Final Office Action from U.S. Appl. No. 17/378,601, Date Mailed: Mar. 15, 2023.

* cited by examiner

WATERPROOF SEAMS AND METHODS OF MAKING THE SAME

RELATED APPLICATIONS

This application claims the benefit of U.S. Provisional Application No. 63/292,260, filed Dec. 21, 2021, the teachings of which are incorporated herein by reference.

BACKGROUND

Outerwear garments, such as coats and jackets, that are designed to be waterproof are commonly made from a two- or three-layer fabric where one of the layers is a waterproof membrane as shown in FIG. 1. The waterproof membrane typically lies on the inner surface of the main textile of the garment. To assemble the garment the seams are sewn to connect the different fabric panels. Along the inside of the garment, the seams are traditionally covered with a waterproofing seam tape to make the garment fully waterproof. Typically, seam tape is either a two- or three-layer construction. A two-layer tape may include a hot melt adhesive layer, and a waterproof membrane or barrier layer. A three-layer tape may additionally include a fabric layer.

These tapes can solve several problems: covering the seams reduces friction against the wearer, the tape can be printed to match the pattern of the inside coating or in the case of three-layer tape, the fabric tape can be designed to match the liner fabric. A critical function of the seam tape is to bond to a waterproof membrane (in two-layer fabric) or a liner fabric (in three-layer fabric) and cover pin holes created by stitching, thereby making the seams waterproof. These tapes are usually applied using hot air sealing machines. The standard waterproofing performance expected by the sealed seam is resistance to a Hydrostatic test at 3 psi for 2 minutes.

However, customized seam tapes can experience various shortcomings. For example, printing customized seam tapes requires the use of high-temperature printing, which can limit the types of adhesives used. In addition, traditional fabric dying and printing require production lead time and are unfavorable for small volume projects.

SUMMARY

Improved methods and product configurations have been identified that allow for customized colors and patterns, such as for projects that are small volume. The methods provide for reduced wastage.

Described herein are methods of manufacturing a waterproof seam tape comprising: preparing a fabric package comprising adhering a polyester fabric to a waterproof membrane; transferring a color or pattern to the polyester fabric of the fabric package; laminating an adhesive composition onto the waterproof membrane of the fabric package, thereby forming a waterproof three-layer tape; and slitting the waterproof three-layer tape into a waterproof seam tape.

In some embodiments, the adhesive composition comprises an aqueous polymer dispersion, a polymer powder, a dispersing agent, and a thickener. In some embodiments, the aqueous polymer dispersion is a polyurethane dispersion. In some embodiments, the adhesive composition further comprises a crosslinker, e.g., an isocyanate crosslinker.

In some embodiments, the polyester fabric is adhered to the waterproof membrane with a glue, optionally where the glue is a PUR glue. In some embodiments, the adhesive composition is about 7 mil. In some embodiments, the fabric package is cured for at least 24 hours after transferring a color pattern to the polyester fabric. In some embodiments, the waterproof seam tape is cured for at least 24 hours after laminating the adhesive composition onto the waterproof membrane. In some embodiments, the waterproof three-layer tape is slit using log slitting or center slitting.

Also disclosed herein are waterproof seam tapes. The waterproof seam tapes may comprise a fabric package comprising a polyester fabric adhered to a waterproof membrane, wherein the fabric package comprises a color or pattern transferred to the polyester fabric of the fabric package; and an adhesive composition laminated onto the waterproof membrane of the fabric package, wherein the waterproof three-layer tape is slit into a waterproof seam tape.

In some embodiments, the adhesive composition comprises an aqueous polymer dispersion, a dispersed polymer powder, a dispersing agent, and a thickener. In some embodiments, the aqueous polymer dispersion is a polyurethane dispersion. In some embodiments, the adhesive composition further comprises a crosslinker (e.g., an isocyanate crosslinker). In some embodiments, the waterproof seam tape is slit using log slitting or center slitting.

BRIEF DESCRIPTION OF THE FIGURES

Characteristics of the present invention will be more fully understood by reference to the following detailed description in conjunction with the attached drawings, in which.

DETAILED DESCRIPTION

Figure 1:
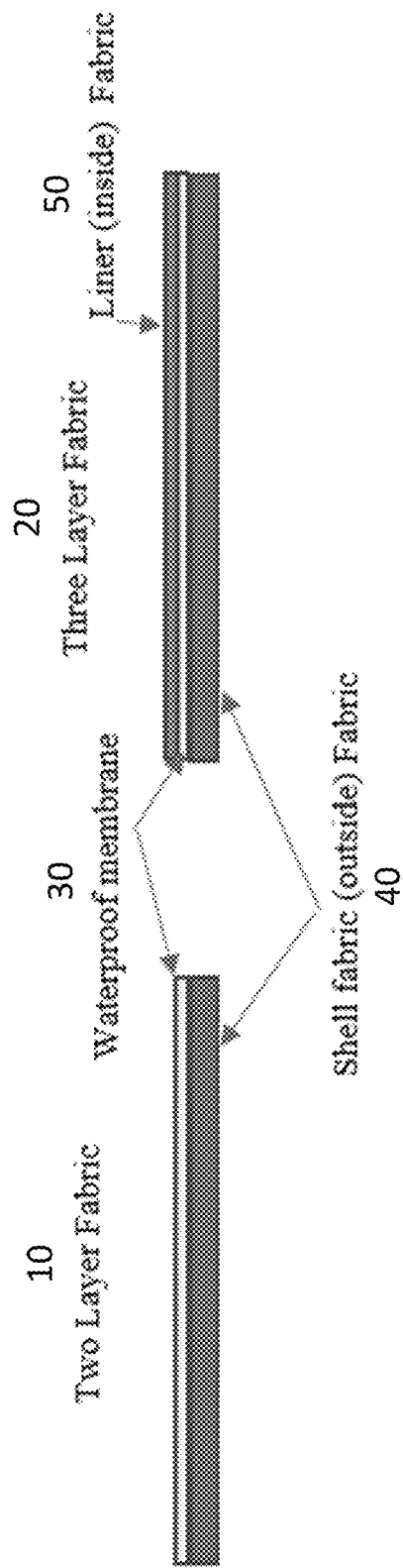
FIG. 1 is a diagrammatic illustration showing the design of a two-layer fabric and a three-layer fabric garment comprising a waterproof membrane for use with the present invention.

Disclosed herein are waterproof tapes (e.g., waterproof seam sealing tapes). The disclosed waterproof tapes block the path of water and are fully waterproof under hydrostatic testing. The waterproof tapes may be applied during the production of a garment or after the garment is produced. In some aspects, the waterproof tape is applied to one or more seams formed when multiple fabric panels are connected. The waterproof tape bonds to the liner fabric and covers pin holes created by stitching. In addition, the waterproof tape reduces friction against the wearer. Further, the waterproof tape can be designed to match the liner fabric FIGS. 1-6, wherein like parts are designated by like reference numerals throughout, illustrate an example embodiment or embodiments of waterproof seam tapes and methods for forming, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Aspects of the invention are directed to methods of manufacturing a waterproof tape. The methods may comprise manufacturing the waterproof tape in multiple stages. In some embodiments, a fabric package is manufactured, and an adhesive layer is added or adhered to the fabric package to form the waterproof tape.

In some embodiments, a fabric package (e.g., a ready-to-print fabric package) is manufactured comprising depositing a glue (e.g., a PUR dot glue) onto a waterproof membrane and adhering a fabric layer to the waterproof membrane. In some aspects, the fabric layer is a polyester fabric layer. The polyester fabric layer may be a white polyester fabric layer. In some aspects, the waterproof membrane is a high melt waterproof membrane. The waterproof membrane may be produced utilizing a blowing method as would be understood by those of skill in the art. For example, thermoplastic resins may be heated up and melt blown onto a carrier substrate to form a continuous thin film, where the thin film may be about 20 to 100, 30 to 90, 40 to 80, or 50 to 70 inches wide. In one aspect, the thin film is about 60 inches wide. In one aspect, the waterproof membrane has a softening point of above 180° C., 200° C., 220° C., or 240° C. In some aspects, the waterproof membrane is clear or white in color. In one embodiment, a high melt barrier waterproof membrane is dot laminated onto a fabric, e.g., a white polyester jersey fabric, with a liquid glue, e.g., a polyurethane reactive (PUR) liquid glue, on a gravure roller.

In some embodiments, a color or graphic is transferred to the fabric package. For example, a color or graphic may be printed on a transfer paper or other suitable transfer medium and then transferred onto the fabric package (e.g., the white fabric package). In some embodiments, the color or graphic on the transfer paper is transferred to the fabric package on a laminator under heat. In some aspects, the sublimated printing temperature is between 180° C. to 200° C. In one aspect, the sublimated printing temperature is about 180° C., 185° C. 190° C., 195° C. or 200° C. After transfer of the color or graphic to the fabric package may require a period of curing time before applying an adhesive layer. In some embodiments, the curing time is at least 12 hours, 18 hours, 24 hours, 30 hours, or 36 hours. In some embodiments, the curing time is about 4 to 48 hours, 8 to 36 hours, 12 to 30 hours, or 18 to 24 hours. In one embodiment, the curing time is at least 24 hours.

In some embodiments, an adhesive layer is added to the fabric package. In one embodiment, the adhesive layer is a backing adhesive. In some embodiments, the adhesive layer is about 1 to 15 mil, 3 to 13 mil, or 5 to 10 mil thick, or optionally about 5, 6, 7, 8, 9, or 10 mil thick. In some embodiments, the adhesive layer is placed on the waterproof membrane of the fabric package to form a waterproof three-layer product. In one embodiment, the adhesive layer is laminated onto the waterproof membrane. After lamination of the adhesive layer onto the waterproof membrane the resulting waterproof three-layer product is cured for a period of time. In some embodiments, the curing time is at least 12 hours, 18 hours, 24 hours, 30 hours, or 36 hours. In some embodiments, the curing time is about 4 to 48 hours, 8 to 36 hours, 12 to 30 hours, or 18 to 24 hours. In one embodiment, the curing time is at least 24 hours.

In some embodiments, the waterproof three-layer tape is slit into a narrow width product. The method of slitting may depend on the color or graphic on the waterproof three-layer tape. In one embodiment, the waterproof three-layer tape is slit using log slitting. For example, if a waterproof three-layer tape comprises a solid print or an allover print pattern, the waterproof three-layer tape is slit using log slitting. In another embodiment, the waterproof three-layer tape is slit using center slitting. For example, if a waterproof three-layer tape comprises a center slit logo or wordmark (e.g., the waterproof three-layer tape requires precise center lining on the middle of a narrow width tape), the waterproof three-layer tape is slit using center slitting.

In some embodiments, a center slitting machine slits the waterproof three-layer tape into a maximum of six spools of narrow width goods. In some aspects, the waterproof three-layer tape is slit into a narrow width of about 1 to 50 mm, 5 to 45 mm, 10 to 40 mm, 15 to 35 mm, or about 20 to 30 mm. In some embodiments, the waterproof three-layer tape is slit into a narrow width of about 5 to 50 mm, 5 to 40 mm, 5 to 30 mm, 5 to 20 mm, 10 to 50 mm, 10 to 40 mm, 10 to 30 mm, 10 to 25 mm, 15 to 50 mm, 15 to 40 mm, or 15 to 30 mm. In some embodiments, a center slit machine includes an optical system for measuring alignment during center slitting operation. The optical system may measure alignment during center slitting to meet a tolerance of +0.5 mm from the tape edge.

The waterproof three-layer tape may be slit to form a spool of waterproof seam tape. In some embodiments, the spool of spliced waterproof seam tape consists of 50 to 100 m, or optionally about 75 m of waterproof seam tape. In some embodiments, the spool of un-spliced waterproof seam tape consists of 25 to 100 m or optionally about 50 m of waterproof seam tape.

In some embodiments, the adhesive layer is formed with an adhesive composition. In some aspects, the adhesive composition is a liquid adhesive. In some aspects, the adhesive composition is a water-based polyurethane. In some aspects, the adhesive composition is a reactive hot melt adhesive. In some aspects, the adhesive composition is a low melting adhesive. In certain aspects, the adhesive composition comprises an aqueous polymer dispersion, a polymer powder, a dispersing agent, a thickener, and optionally a crosslinking agent. The adhesive composition may be free of solvents.

"Aqueous polymer dispersion," "aqueous polymer emulsion," and "aqueous polymer colloid" are used herein interchangeably. In some aspects, an aqueous polymer dispersion is a single polymer dispersion. In other aspects, an aqueous polymer dispersion is a blend of two or more aqueous polymer dispersions. In some aspects, the aqueous polymer dispersion acts as a dispersant. The aqueous polymer dispersion is a single aqueous polymer dispersion, or a blend of two or more aqueous polymer dispersions, which is capable of stabilizing a dispersion of a polymeric powder in water. In certain aspects, the aqueous polymer dispersion is selected from the group consisting of aqueous polyurethane-urea anionomers (also referred to herein as polyurethane dispersions or PUDs), aqueous acrylic emulsions, aqueous styrene acrylic emulsions, aqueous acrylic vinyl acetate emulsions, aqueous epoxy dispersions, aqueous polyamide dispersions, aqueous polyester dispersions (e.g., alkyds), and combinations thereof. As used herein, "acrylic" covers copolymers of any acrylic or methacrylic monomer, such as methyl methacrylate, n-butyl acrylate, ethyl hexyl acrylate, n-butyl methacrylate, acrylic acid, methacrylic acid, and the like.

In some embodiments, the aqueous polymer dispersion is an aqueous polyurethane dispersion or an aqueous acrylic emulsion. In some embodiments, the aqueous polymer dispersion is an aqueous polyurethane dispersion (e.g., an aliphatic polyester polyurethane). In some embodiments, the aqueous polymer dispersion is a blend of at least two polyurethane dispersions. Non-limiting examples of polyurethane dispersions include: NeoRez R-600, NeoRez R-9621, NeoRez R-9630, and NeoRez R-9430 from DSM; the Dispercoll range from Covestro, including Dispercoll U56, Dispercoll U54, and Dispercoll U2682; and Sancure 20025F from Lubrizol.

In some embodiments, the polymer powder is selected from the group consisting of co-polyesters, polyester urethanes, polyether urethanes, ethylene vinyl acetates, co-polyamides, polyamides, polyureas, polyolefins, polycarbonate urethanes, epoxy-polyester, and combinations thereof. In certain embodiments, the polymer powder is a polyamide. In certain embodiments, the polymer powder is a polyurethane powder. In certain embodiments, the polymer powder is a polycarbonate urethane. Non-limiting examples of polymer powders include: UNEX 4073 from Fixatti and Griltex 1A from EMS-Griltech.

In some aspects, a dispersing agent is a surfactant and/or a polymer dispersant. In some aspects, a dispersing agent is a non-ionic surfactant, an anionic surfactant, or a combination or hybrid of a non-ionic surfactant and an anionic surfactant. In some aspects, a dispersing agent is an acrylic polymer dispersant or a polyurethane dispersant. Non-limiting examples of dispersing agents include: Dowfax 3B2 from Dow; Dispex AA and Dispex CX from BASF; Metolat 355 and Metolat 388 from Munzig; Jeffsperse X3503 from Huntsman; Zetasperse 2500 from Evonik; Solsperse W100 from Lubrizol, and Altoma Carrier 10628 from Bolger & O'Hearn.

In some embodiments, a thickener is a water based acrylic. A thickener may be selected from the group consisting of a hydrophobically modified ethoxylated urethane (HEUR) thickener, a hydrophobically modified alkali swellable emulsion (HASE) thickener, a hydroxyethyl cellulose (HEC) thickener, a cellulosic thickener, an inorganic thickener (e.g., bentonite clays), and combinations thereof. Non-limiting examples of thickeners include: Altoma 1953 from Bolger & O'Hearn; Acrysol ASE-60, Acrysol DR-106, and Acrysol RM-845 from Dow; Rheovis PU 1251 from BASF; Borchi Gel ALA from Borchers GmbH; Coapur 6050 from Arkema; and Tego Rheo 8510 from Evonik.

In some embodiments, an adhesive composition further comprises a crosslinking agent (e.g., a reactive component to allow the system to crosslink). In some aspects, the crosslinking agent is a multi-functional isocyanate crosslinking agent or a blocked isocyanate crosslinking agent. In some aspects, the crosslinking agent is an aziridine crosslinking agent. Non-limiting examples of a crosslinking agent are Dispercoll BL XP 2514 and Imprafix 2794 from Covestro. A multi-functional isocyanate crosslinking agent, e.g., an encapsulated toluene diisocyanate (TDI) crosslinker, may be active at low temperatures (e.g., about 90° C.-110° C.) and may therefore be beneficial for use with a delicate fabric. A blocked isocyanate crosslinker requires a higher activation temperature (e.g., about 135° C.), and is therefore more stable for storage at high temperatures.

In some embodiments, an adhesive composition further comprises an additive. In some aspects, an additive is a defoaming agent, such as Foam Blast 301S from DyStar. In some aspects, an additive is a silicone additive, such as silicone containing additives from Byk. In some aspects, an additive is a multi-functional amine, such as Jeffamine T403 from Huntsman Performance Products. A multi-functional amine may be added to an adhesive composition comprising a crosslinker to provide additional stabilization.

Additional examples of adhesive compositions suitable for use in forming a waterproof seam are disclosed in U.S. application Ser. No. 16/910,733, the entirety of which is incorporated herein by reference.

As shown in FIG. 1, a conventional textile may be a two-layer fabric 10 or a three-layer fabric 20. In some aspects, a two-layer fabric 10 comprises a waterproof membrane or water blocking layer 30, e.g., an inner waterproof membrane 120 (see FIG. 2 and FIG. 3), and an outer layer 40, e.g., an outer shell fabric. In some aspects, a three-layer fabric 20 comprises a waterproof membrane or water blocking layer 30 between an outer layer 40, e.g., an outer shell fabric, and an inner layer 50, e.g., a liner fabric.

In some aspects, a fabric layer is an open weave fabric layer, such as a breathable or porous polyurethane. In some aspects, a fabric layer is a tightly woven fabric layer, such as a tightly woven nylon (e.g., rip-stop nylon) or polyester. In some aspects, a fabric layer is treated with a coating. For example, a fabric layer, e.g., an outer shell fabric, may be treated with a durable water repellant (DWR). A DWR coating may be fluorinated, silicone, or olefinic in nature. In other aspects, a fabric layer may have a polyurethane coating. In some aspects, a fabric layer may be a polytetrafluoroethylene (PTFE) or may be coated with a PTFE film. In some aspects, a fabric layer satisfies the standards of OEKO TEX and/or AFIRM RSL.

Figure 2:
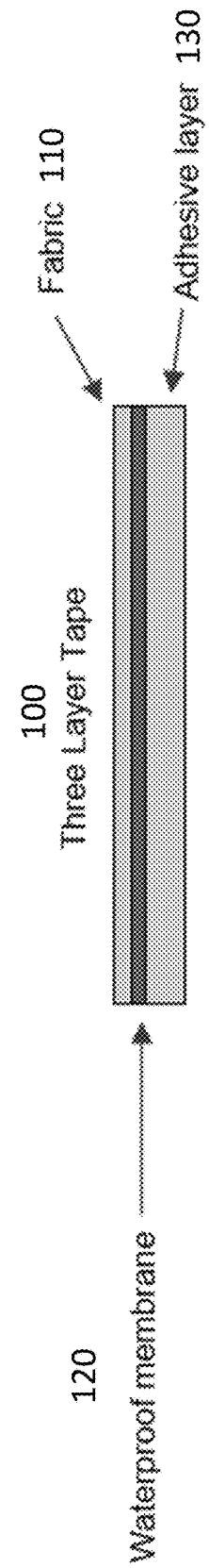
FIG. 2 is a diagrammatic illustration showing the design of a three-layer seam tape comprising a waterproof membrane.
Figure 3:
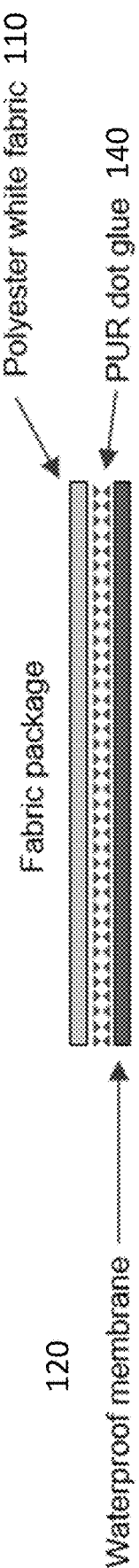
FIG. 3 is a diagrammatic illustration showing the design of a three-layer seam tape comprising a waterproof membrane.
Figure 4:
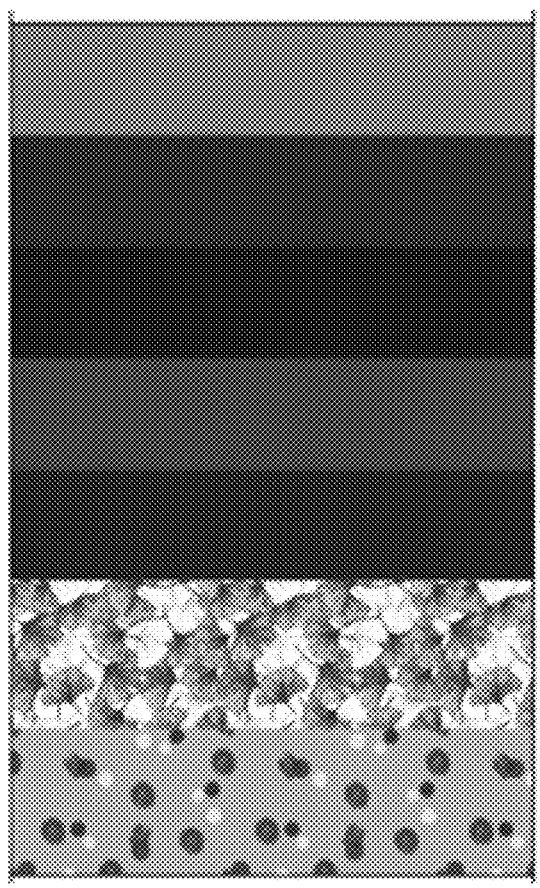
FIG. 4 is a photograph showing examples of print design.
Figure 5:
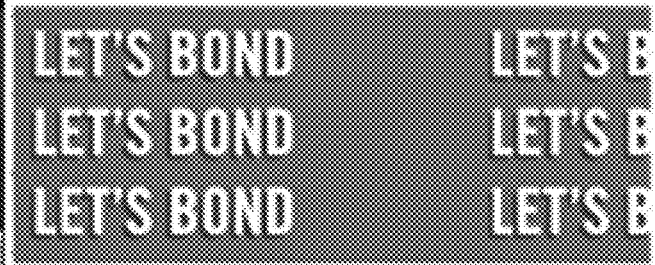
FIG. 5 is a photograph showing examples of print design.

As shown in FIG. 2, in accordance with one embodiment, a waterproof seam tape 100 is depicted. In some aspects, the waterproof seam tape 100 is a three-layer tape. In some embodiments, the waterproof seam tape 100 comprises a fabric layer 110, a waterproof membrane 120, and an adhesive layer 130. Waterproof membrane 120 may be located between adhesive layer 130 and fabric layer 110.

A fabric package 150 may be prepared prior to adding adhesive layer 130 to form the waterproof steam tape 100. A glue 140 may be deposited on waterproof membrane 120. In some aspects, glue 140 is a PUR glue. In some aspects glue 140 is dot deposited on waterproof membrane 120. Waterproof membrane 120 may be adhered to fabric layer 110 to form the fabric package 150. In some aspects, fabric layer 110 is a polyester fabric. In some aspects, fabric layer 110 is a white polyester fabric. A color or graphic may be printed on a transfer paper (FIGS. 4-5) and then transferred to fabric layer 110 resulting in fabric package 150 comprising a color or graphic.

Adhesive layer 130 may be added to fabric package 150. In some aspects, adhesive layer 130 is a backing adhesive. In some aspects, adhesive layer 130 comprises a low melt temperature adhesive. Adhesive layer 130 may be laminated to fabric package 150 forming a waterproof three-layer product. The waterproof three-layer product may be slit into a narrow width waterproof seam tape 100.

Figure 6:
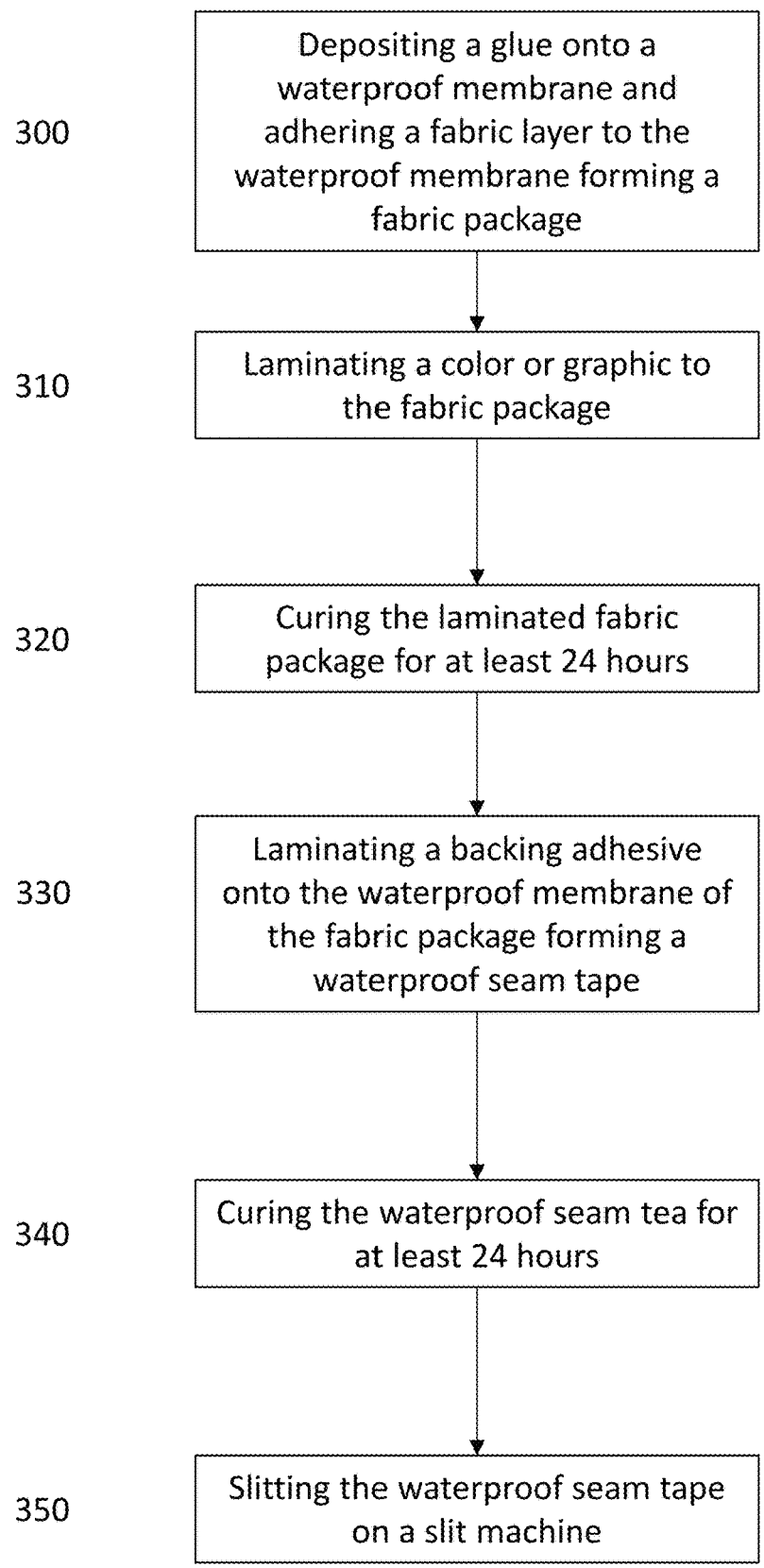
FIG. 6 is a flowchart illustrating a method of forming a waterproof seam tape.

As outlined in FIG. 6, a method of forming a waterproof seam tape 100 may comprise the steps of: depositing a glue onto a waterproof membrane 120 and adhering a fabric layer to the waterproof membrane 120 forming a fabric package 150 (step 300); laminating a color or graphic to the fabric layer of the fabric package 150 (step 310); curing the laminated fabric package for at least 24 hours (step 320); laminating a backing adhesive onto the waterproof membrane 120 of the fabric package 150 forming a waterproof seam tape 100 (step 330); curing the waterproof seam tape 100 for at least 24 hours (step 340); and slitting the waterproof seam tape 100 into narrow width product (step 350), thereby forming a waterproof seam tape 100.

A waterproof seam tape 100 formed by the methods described herein and applied to a seam of a garment may create a fully waterproof seam. For example, a waterproof seam may be waterproof under hydrostatic testing according to one or more standards known to those of skill in the art. Hydrostatic testing comprises testing water pressure resistance according to one or more test standards, including, but not limited to AATCC 127 (AATCC TM127-2017 (2018) e, Test Method for Water Resistance: Hydrostatic Pressure, developed in 1968 by AATCC Committee RA63 (Reaffirmed 2018; Editorially Revised 2019)); AATCC 35 (AATCC TM35-2018e, Test Method for Water Resistance: Rain, developed in 1947 by AATCC Committee RA63); BS EN ISO 811 (BS EN 20811 ISO 811, Textiles-Determination of resistance to water penetration-Hydrostatic pressure test, 2018 Edition, May 31, 2018); and NWSP 80.6 (NWSP 80.6 Evaluation of Water Resistance (Hydrostatic Pressure) Test).

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the invention where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity, those embodiments have not in every case been specifically set forth in so many words herein. It should also be understood that any embodiment or aspect of the invention can be explicitly excluded from the claims, regardless of whether the specific exclusion is recited in the specification. For example, any one or more active agents, additives, ingredients, optional agents, types of organism, disorders, subjects, or combinations thereof, can be excluded.

Where ranges are given herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. It is also understood that where a series of numerical values is stated herein, the invention includes embodiments that relate analogously to any intervening value or range defined by any two values in the series, and that the lowest value may be taken as a minimum and the greatest value may be taken as a maximum. Numerical values, as used herein, include values expressed as percentages. For any embodiment of the invention in which a numerical value is prefaced by "about" or "approximately", the invention includes an embodiment in which the exact value is recited. For any embodiment of the invention in which a numerical value is not prefaced by "about" or "approximately", the invention includes an embodiment in which the value is prefaced by "about" or "approximately".

"Approximately" or "about" generally includes numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value). It should be understood that, unless clearly indicated to the contrary, in any methods claimed herein that include more than one act, the order of the acts of the method is not necessarily limited to the order in which the acts of the method are recited, but the invention includes embodiments in which the order is so limited. It should also be understood that unless otherwise indicated or evident from the context, any product or composition described herein may be considered "isolated".

As used herein the term "comprising" or "comprises" is used in reference to compositions, methods, and respective component(s) thereof, that are essential to the invention, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

It is to be understood that the inventions disclosed herein are not limited in their application to the details set forth in the description or as exemplified. The invention encompasses other embodiments and is capable of being practiced or carried out in various ways. Also, it is to be understood that the phraseology and terminology employed herein is for the purpose of description and should not be regarded as limiting.

While certain compositions and methods of the present invention have been described with specificity in accordance with certain embodiments, the following examples serve only to illustrate the methods and compositions of the invention and are not intended to limit the same.

EXEMPLIFICATION

Quality Testing of the Waterproof Seam Tape

Individual components of the waterproof seam tape may be tested to assess and confirm the quality of the waterproof seam tapes manufactured using the methods described herein. Each batch of the waterproof seam tapes manufactured may be assessed. For example, the individual components of the waterproof seam tape may be assessed during the manufacturing process. Examples of the individual components of the waterproof seam tape that may be assessed include, but are not limited to, the fabric package, the adhesive, and/or the finished product.

The assessment of the fabric package will include measuring and assessing the total weight of the fabric package and/or the membrane softening point of the fabric package. The assessment of the adhesive will include measuring and assessing the film thickness of the adhesive, the total weight of the adhesive, and/or the softening point of the adhesive. The assessment of the waterproof seam tape will include measuring and assessing the total thickness of the tape and/or the peel strength of the tape. The various features and attributes of the waterproof seam tape will be measured and assessed using standard testing techniques known to those of skill in the art.

What is claimed is:

1. A method of manufacturing a waterproof seam tape, comprising:
    a. preparing a fabric package comprising adhering a polyester fabric to a waterproof membrane;
    b. transferring a color or pattern to the polyester fabric of the fabric package;
    c. laminating an adhesive composition comprising at least one polyurethane dispersion, a polyurethane powder, a polyurethane dispersing agent, and a thickener, onto the waterproof membrane of the fabric package, thereby forming a waterproof three-layer tape; and
    d. slitting the waterproof three-layer tape into a waterproof seam tape.

2. The method of claim 1, wherein the adhesive composition further comprises a crosslinker.

3. The method of claim 2, wherein the crosslinker is an isocyanate crosslinker.

4. The method of claim 1, wherein the polyester fabric is adhered to the waterproof membrane with a glue.

5. The method of claim 4, wherein the glue is a PUR glue.

6. The method of claim 1, wherein the adhesive composition is about 7 mil.

7. The method of claim 1, wherein the fabric package is cured for at least 24 hours after transferring a color pattern to the polyester fabric.

8. The method of claim 1, wherein the waterproof seam tape is cured for at least 24 hours after laminating the adhesive composition onto the waterproof membrane.

9. The method of claim 1, wherein the waterproof three-layer tape is slit using log slitting or center slitting.

10. The method of claim 1, wherein the waterproof membrane comprises a thermoplastic resin.

11. The method of claim 1, wherein the waterproof membrane has a softening point of about 220° C.

12. The method of claim 1, wherein the color or pattern is transferred to the polyester fabric at a temperature between 180° C. and 200° C.

* * * * *